(12) United States Patent
Yoo et al.

(10) Patent No.: US 9,720,204 B2
(45) Date of Patent: Aug. 1, 2017

(54) MOTOR FOR ACTUATING LENS

(71) Applicant: LG INNOTEK CO., LTD., Seoul (KR)

(72) Inventors: Kyoung Ho Yoo, Seoul (KR); Seung Taek Shin, Seoul (KR); Jin Suk Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/560,386

(22) Filed: Dec. 4, 2014

(65) Prior Publication Data

US 2015/0153539 A1 Jun. 4, 2015

(30) Foreign Application Priority Data

Dec. 4, 2013 (KR) .................. 10-2013-0149990
Dec. 4, 2013 (KR) .................. 10-2013-0150003

(51) Int. Cl.
| | | |
|---|---|---|
| H04N 5/225 | (2006.01) | |
| H04N 5/228 | (2006.01) | |
| G03B 17/00 | (2006.01) | |
| G02B 7/04 | (2006.01) | |
| G03B 13/34 | (2006.01) | |
| G02B 27/64 | (2006.01) | |

(Continued)

(52) U.S. Cl.
CPC ............ *G02B 7/04* (2013.01); *G02B 27/0006* (2013.01); *G02B 27/646* (2013.01); *G03B 13/34* (2013.01); *H04N 5/2254* (2013.01); *H04N 5/2257* (2013.01); *G03B 3/10* (2013.01); *G03B 2205/0069* (2013.01)

(58) Field of Classification Search
CPC ............ H04N 5/2328; H04N 5/23287; H04N 5/23293; H04N 5/23296; H04N 5/2353; H04N 5/23264; H04N 5/23248; G03B 2205/0053; G03B 2205/0007; G02B 7/04; G02B 27/006
USPC .......... 348/208.99, 373, 208.1, 208.2, 208.4, 348/208.5, 208.11, 374; 359/554; 396/52, 296, 55

See application file for complete search history.

(56) References Cited

U.S. PATENT DOCUMENTS

| | | | |
|---|---|---|---|
| 2007/0030665 A1* | 2/2007 | Shyu ............. | G02B 13/001 362/35 |
| 2008/0055753 A1* | 3/2008 | Takahashi ......... | G02B 7/08 359/824 |

(Continued)

FOREIGN PATENT DOCUMENTS

JP 2013-044924 3/2013

*Primary Examiner* — Xi Wang
(74) *Attorney, Agent, or Firm* — KED & Associates, LLP

(57) ABSTRACT

A lens actuating motor is provided, the lens actuating motor including a first mover arranged at a lateral surface of a lens part to move the lens part, a second mover configured to accommodate the first mover for vertical movement, a stator positioned at a bottom surface of the second mover to horizontally move the second mover and centrally formed with a through hole corresponding to the lens part, and a base including an accommodation lug configured to support the stator and the second mover, centrally formed with a hollow hole corresponding to the through hole of the stator, and inserted into the through hole of the stator by being protruded from an upper surface formed with the hollow hole.

20 Claims, 6 Drawing Sheets

(51) Int. Cl.
*G02B 27/00* (2006.01)
*G03B 3/10* (2006.01)

(56) References Cited

U.S. PATENT DOCUMENTS

| | | | |
|---|---|---|---|
| 2008/0259470 A1* | 10/2008 | Chung | G02B 7/08 359/823 |
| 2009/0059398 A1* | 3/2009 | Tsai | G02B 13/0025 359/819 |
| 2009/0102403 A1* | 4/2009 | Lule | H02P 25/034 318/135 |
| 2009/0140581 A1* | 6/2009 | Liu | H02K 41/0356 310/12.24 |
| 2010/0149354 A1* | 6/2010 | Makimoto | G02B 27/646 348/208.99 |
| 2010/0165132 A1* | 7/2010 | Tokiwa | G02B 27/646 348/208.11 |
| 2010/0302437 A1* | 12/2010 | Kobayashi | H04N 5/2253 348/374 |
| 2011/0122267 A1* | 5/2011 | Ahn | G03B 5/00 348/208.7 |
| 2011/0134303 A1* | 6/2011 | Jung | H01L 27/14618 348/340 |
| 2011/0241450 A1* | 10/2011 | Hsu | H02K 41/0356 310/12.16 |
| 2012/0154614 A1* | 6/2012 | Moriya | G03B 3/10 348/208.5 |
| 2013/0163085 A1* | 6/2013 | Lim | H02K 41/0356 359/557 |
| 2014/0184891 A1* | 7/2014 | Lee | G03B 3/02 348/357 |
| 2014/0333829 A1* | 11/2014 | Lee | H04N 5/2251 348/373 |
| 2015/0022891 A1* | 1/2015 | Hu | G02B 7/08 359/557 |
| 2015/0070765 A1* | 3/2015 | Lam | G02B 7/08 359/508 |
| 2016/0018624 A1* | 1/2016 | Yeo | G03B 5/00 359/557 |

\* cited by examiner

MOTOR FOR ACTUATING LENS

CROSS-REFERENCE TO RELATED APPLICATIONS

This application claims priority under 35 U.S.C. §119 to Korean Patent Application Nos. 10-2013-0149990, and 10-2013-0150003, both filed on Dec. 4, 2013, whose entire disclosures are hereby incorporated by reference.

BACKGROUND

1. Field

The teachings in accordance with the exemplary embodiments of this present disclosure generally relate to a structure-improved motor for actuating lens (hereinafter referred to as lens actuating motor).

2. Background

Concomitant with wide generalization of distribution of various mobile terminals and commercialization of wireless Internet services, consumer demands related to the mobile terminals have become diversified, and as a result, various types of peripheral devices are mounted on the mobile terminals. Among the various types of mobile terminals, representative is a camera module configured to capture an object in a photograph or a video, store the object by way of an image data, and to edit and transmit the image data.

Recently, demand on small-sized lens actuating motors is high as image input devices for various multimedia fields such as note type personal computers, camera phones, PDAs (Personal Digital Assistants), smart phones and toys.

A conventional lens actuating motor may be largely classified to an FF (Fixed Focus) type, an AF (Auto Focus) type and an OIS (Optical Image Stabilization) type lens actuating motor. The lens actuating motors have shared developments continuously waged to protect constituent elements inside a cover can from penetrated or generated foreign objects. Particularly, the OIS type lens actuating motor is mounted with an FPCB as a constituent element to implement a handshake prevention function, where there may be generated a problem in which foreign objects generated or generated at a later time when processed in a shape catering to an interior of the lens actuating motor are introduced into an image sensor.

The foreign objects may cause a problem that resultantly deteriorates the quality and performance of the lens driving motor. Furthermore, there may be generated a problem in which fixture of the FPCB mounted at a base and a coil unit gets loose from the base to deteriorate the reliability of the lens driving motor.

BRIEF DESCRIPTION OF THE DRAWINGS

The embodiments will be described in detail with reference to the following drawings in which like reference numerals refer to like elements wherein.

DETAILED DESCRIPTION

Hereinafter, embodiments of the present disclosure will be described in detail with reference to the accompanying drawings.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Terms used in the specification are only provided to illustrate the embodiments and should not be construed as limiting the scope and spirit of the present disclosure. The same reference numbers will be used throughout the specification to refer to the same or like parts.

Now, the lens actuating motor according to the exemplary embodiments of the present disclosure will be described in detail with reference to the accompanying drawings.

Figure 1:
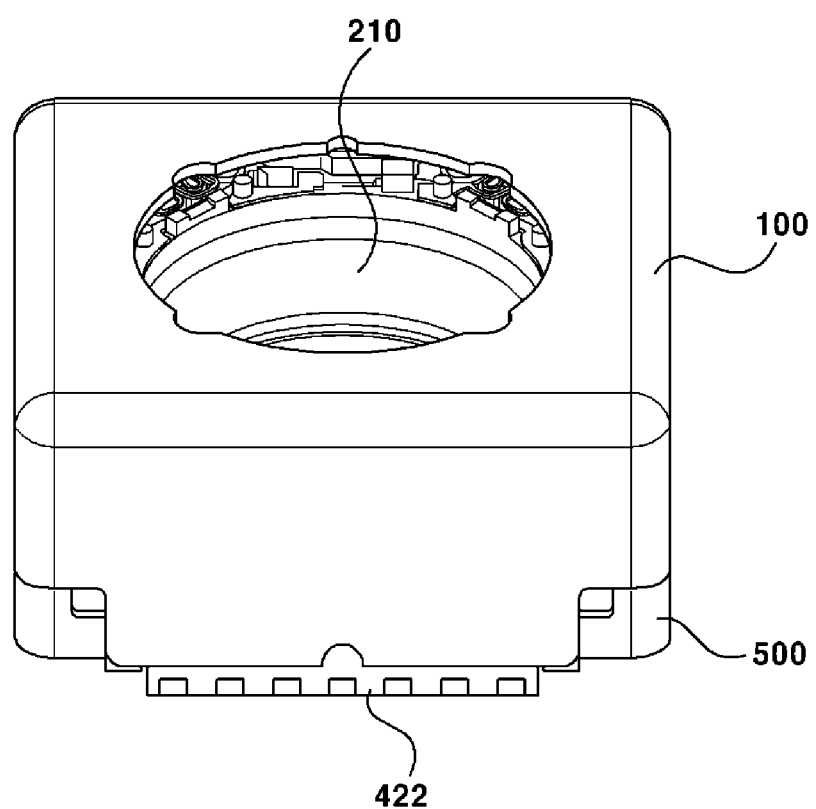
FIG. 1 is a schematic coupled perspective view of a lens actuating motor according to a first exemplary embodiment of the present disclosure.
Figure 2:
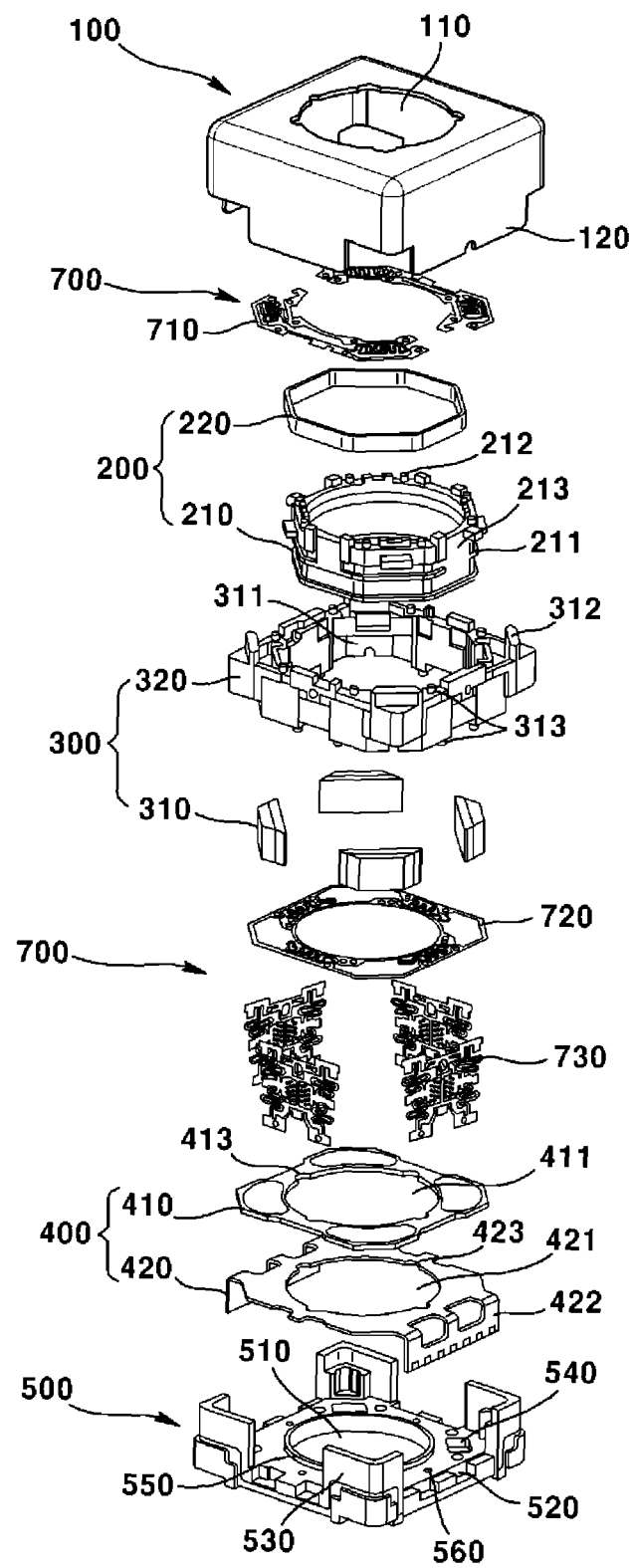
FIG. 2 is an exploded perspective view of a lens actuating motor according to a first exemplary embodiment of the present disclosure.
Figure 3:
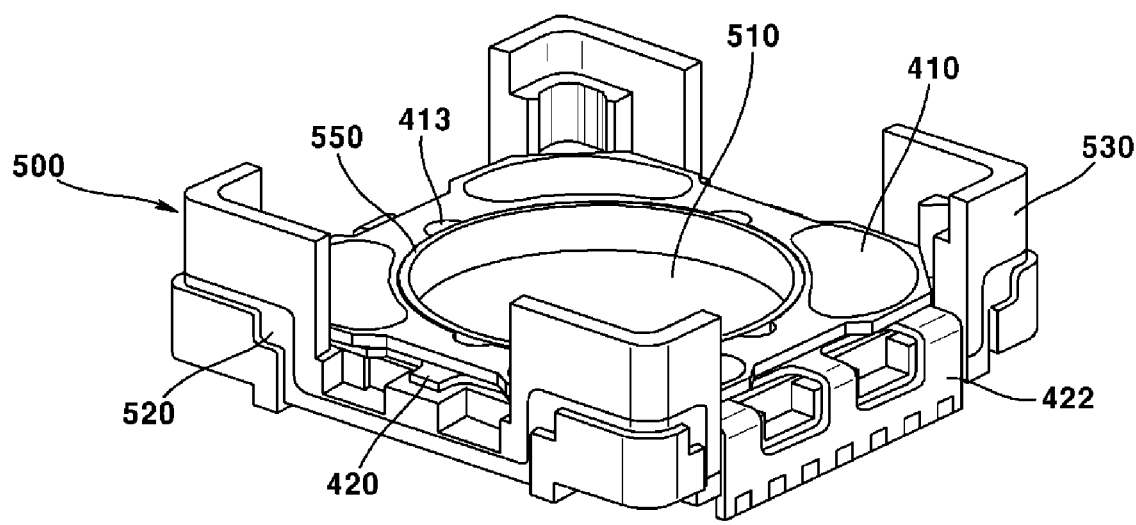
FIG. 3 is a schematic perspective view of a base and a stator coupled according to a first exemplary embodiment of the present disclosure.
Figure 4:
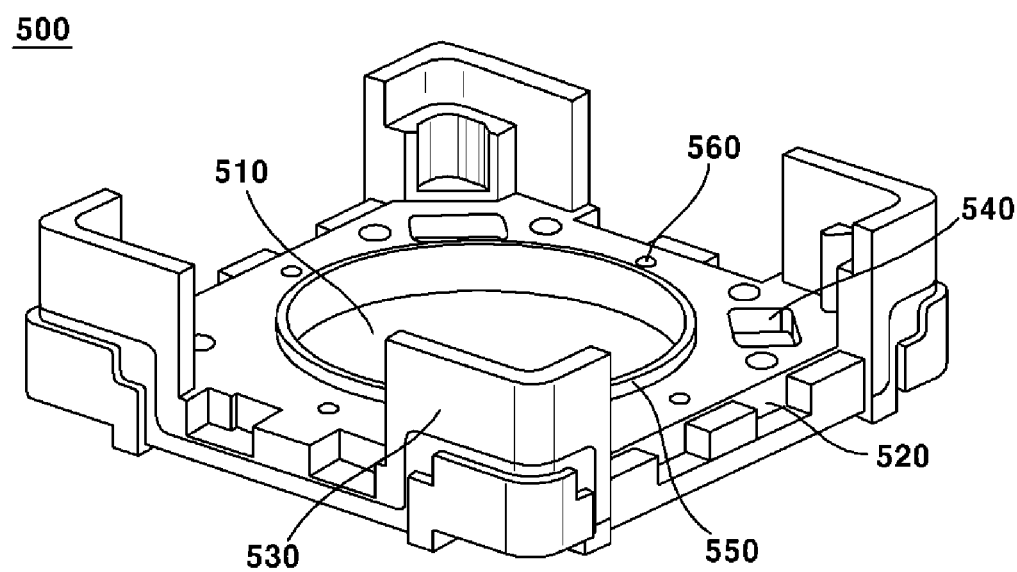
FIG. 4 is a perspective view of a base according to a first exemplary embodiment of the present disclosure.

FIG. 1 is a schematic coupled perspective view of a lens actuating motor according to a first exemplary embodiment of the present disclosure, FIG. 2 is an exploded perspective view of a lens actuating motor according to a first exemplary embodiment of the present disclosure, FIG. 3 is a schematic perspective view of a base and a stator coupled according to a first exemplary embodiment of the present disclosure, and FIG. 4 is a perspective view of a base according to a first exemplary embodiment of the present disclosure.

Referring to FIGS. 1 to 4, a lens actuating motor according to a first exemplary embodiment of the present disclosure may largely include a cover can 100, a first mover 200, a second mover 300, a stator 400, a base 500 and an elastic unit 700. Furthermore, the lens actuating motor may further include a PCB, an IR (Infrared) filter, and an image sensor, albeit not illustrated.

The cover can 100 may form an exterior look of the lens actuating motor by being mounted on the base 500 by accommodating the elastic unit 700 (described later), the first mover 200, the stator 400 and the second mover 300. To be more specific, the cover can 100 is mounted on the base 500 by being in a close contact at an inner surface thereof with a partial or an entire portion of a lateral surface of the base 100 to protect inner constituent elements against an external shock and to prevent external foreign objects from entering the lens actuating motor.

Furthermore, the cover can 100 also performs a function of protecting constituent elements of the lens actuating motor or a camera module against external electronic interference generated by a mobile terminal. Thus, the cover can 100 is preferably formed with a metal material. The cover can 100 may be realized by a yoke part (described later) itself, or the yoke part may be mold-processed inside the cover can 100 for fixation.

In the exemplary embodiment of the present disclosure, an upper surface of the cover can 100 may be formed with an opening 110 to expose a lens part (not shown), and a lower part of the upper surface of the cover can 100 may be formed with an inner yoke (not shown) bent inwardly toward the cover can 100. The inner yoke may be positioned at a concave part 213 formed at the bobbin 210 (described later).

In this case, the inner yoke may be arranged at a corner around an opening at an upper surface of the yoke part, or may be arranged at a lateral surface, where the concave part of the bobbin may be positioned at a corresponding position.

Furthermore, the cover can 100 may be formed at each lower part with at least one extensive fastening piece 120, and the base 500 (described later) may be formed with a fastening groove 520 inserted by the fastening piece 120 to thereby realize a more secure tightening and fastening function of the lens actuating motor. The fastening piece and the fastening groove may not be separately mounted, only one of the fastening piece and the fastening groove may be formed.

Meantime, the first mover 200 may be arranged at a lateral surface of the lens part for moving the lens part (not shown). The first mover 200 may include a bobbin configured to fix the lens part and a first coil part 220 arranged at a periphery of the bobbin 210.

The lens part (not shown) may be a lens barrel mounted with one or more lenses (not shown). The lens part according to the present disclosure is not limited thereto, and may include any holder structure configured to support the lenses. Furthermore, an inner surface of the bobbin 210 fixes the lens part by being coupled to a periphery of the lens part. The bobbin 210 may be formed at a periphery with a guide part 211 configured to guide winding or mounting of the first coil part 220 (described later). The guide part 211 may be integrally formed with a periphery of the bobbin 210, or may be continuously formed along the periphery of the bobbin 210 or discretely formed at a predetermined space.

Furthermore, an upper surface and a bottom surface of the bobbin 210 may be formed with a spring fastening lug 212 fastened by an upper spring 710 or a bottom spring 720 to allow the bobbin 210 to be supported relative to an upper part and a lower part of a housing 320. The bobbin 210 may further include a concave part 213 formed at a periphery to allow an inner yoke of the cover can 100 (described later) to be interposed between the bobbin 210 and the first coil part 220 wound on the bobbin 210.

The first coil part 220 may be guided to the guide part 211 to be wound on a periphery of the bobbin 210, but four individual coils may be arranged at a periphery of the bobbin 210, each at a 90° interval. The first coil part 220 may form an electromagnetic field by receiving an electric power from a PCB (Printed Circuit Board, described later).

Meantime, the second mover 300 may include a magnet part 310 positioned at a lateral surface of the first mover 200, opposite to the first mover 200, and opposite to the first coil part 220, and a housing 320 fixed by the magnet part 310.

To be more specific, the magnet part 310 may be mounted on the housing 320 using an adhesive so as to be arranged at a position opposite to a periphery of the first coil part 220, and four magnet parts 310 may be mounted inside the housing 320 each at an equidistance to allow efficient use of internal space. The housing 320 may be formed in a shape corresponding to an inner lateral surface of the cover can 100 forming an exterior look of the lens actuating motor. Furthermore, the housing 320 may be formed with an insulating material as an injection molding product in consideration of productivity, and the housing 320 may be distantly arranged at a predetermined space from the cover can 100 as a part moving for OIS (Optical Image Stabilization) driving.

In the present exemplary embodiment, the housing 320 may be formed in a hexahedral shape corresponding to that of the cover can 100 distanced at a predetermined space, and may be opened at upper and bottom surfaces to accommodate the first mover 200 to vertically move therein. Furthermore, the housing 320 may include at a lateral surface a magnet part fastening hole 311 or a magnet part fastening groove formed in a shape corresponding to that of the magnet part 310.

The housing 320 may also include, at an upper surface, at least two stoppers 312 protrusively formed each at a predetermined space apart to absorb a shock by being contacted to an upper surface of the cover can 100 when there is provided an external shock. The stoppers 312 may be integrally formed with the housing 320.

Furthermore, an upper surface and a bottom surface of the housing 320 may be formed with a spring fastening lug 313 fastened by an upper spring 710 and a bottom spring 720, as in the bobbin 210. The stator 400 is positioned opposite to a lower part of the second mover 300 in order to move the second mover 300, and through holes 411, 421 may be centrally formed that correspond to the lens part.

To be more specific, the stator 400 may include a second coil part 410 positioned opposite to a bottom surface of the magnet part 310, and a substrate configured to apply an electric power by being arranged at an upper surface of the second coil part 410, where the substrate may be a FPCB (Flexible Printed Circuit Board, 420).

The second coil part 410 may be mounted on the FPCB 420 formed at an upper surface of the base (500, described later) or on the substrate, and may be centrally formed with a through hole 411 to pass through an optical signal of the lens part (not shown). Meanwhile, for the miniaturization of the lens actuating motor, to be more specific, in consideration of reduction in height to z axis direction which is an optical direction, the second coil part 410 may be arranged on the FPCB by being formed with an FP (Patterned Coil).

The FPCB 420 may be formed at an upper surface of the base 500 in order to apply an electric power to the second coil part 410, and may include the through hole 421 corresponding to the through hole 411 of the second coil part 410. Furthermore, the FPCB 420 may include a terminal part 422 protruded beneath the base 500 by being bent at one end or both ends each one facing the other, and receive an external electric power through the terminal part 422.

In the present exemplary embodiment, a Hall sensor part (not shown) may be further included that is mounted at a bottom surface or an upper surface of the FPCB 420 in order to correspond to a position of the magnet part 310. The Hall sensor part functions to monitor movement of the magnet part 310 and is disposed to accurately control the actuator by interacting with the FPCB 420.

The Hall sensor part may be formed on a straight line parallel with an optical axis of the magnet part 310 to monitor displacement of the x axis and y axis, and for that purpose, the Hall sensor part may include two Hall sensors formed at two adjacent corners of corners of the FPCB. Thus, the base 500 may be formed with a Hall sensor accommodation groove 540 configured to accommodate the Hall sensors, where one or more Hall sensors may be formed.

The Hall sensor part may be more adjacently formed to the second coil part 410 than the magnet part 310, but influence of the second coil part 410 may not be considered in monitoring the movement of magnet part 310 in consideration of the fact that the magnitude of magnetic field formed by the magnet part is greater by several hundred than that of the coil. The lens part can be moved to all directions by independent action and/or organic interaction of the first mover 200, the second mover 300 and the stator 400, an image of an object can be focused by the interaction of the first mover 200, and/or the second mover 300, and handshake can be corrected by the interaction of the first mover 200 and/or the second mover 300.

Meantime, the base 500 functions to support the stator 400 and the second mover 300, and is centrally formed with a through hole 510 corresponding to the through holes 411, 421. The base 500 may function as a sensor holder configured to protect an image sensor (described later) and may be formed to position an IR (Infrared) filter (not shown). In this case, the IR filter may be mounted on a hollow hole 510 centrally formed at the base 500 and may be mounted with an Infrared ray filter. Furthermore, the IR filter may be formed with a film material or a glass material, for example, and may be arranged with an infrared cut-off coating material on a flat-type optical filter of an image surface protective cover glass or a cover glass. Furthermore, a separate sensor holder may be positioned under the base.

The base 500 may be formed with one or more fixed lugs 530 protruded from an upper corner to contact or to be coupled to an inner lateral surface of the cover can 100, where the fixed lug 530 functions to facilitate guidance of the fastening at the cover can 100 and simultaneously to securely fix the cover can 100 after fastening. The base 500 may be formed with a fastening groove 520 inserted by a fastening piece 120 of the cover can 100.

The fastening groove 520 may be locally formed at an external surface of the base 500 in a shape corresponding to a length of the fastening piece 120, or may be on an entire surface of the external surface of the base to allow a predetermined part at the lower part of the cover can 100 to be inserted. At this time, foreign objects may be inserted through the stator 400, the through holes 411, 421 of the base 500 and the hollow hole 510, and the foreign objects may deteriorate the performances of the lens actuating motor by polluting various elements and image sensor mounted on the PCB formed thereunder.

Particularly, the FP coil and/or FPCB 420 are used when an OIS function is added, where the through holes 411, 421 are formed at a central part, and other shapes conforming to those of the lens actuating motor are processed during which time, many foreign objects are generated and the foreign objects disadvantageously remain unremoved, even if cleaning process is performed after the manufacturing processing is finished.

Thus, the first exemplary embodiment of the present disclosure includes an accommodation lug 550 protruded from an upper surface of the base 500 formed with the hollow hole 510. To be more specific, the accommodation lug 550 is formed to wrap an inner surface of the through holes 411, 421 of the stator 400 by being inserted into the through holes 411, 421 of the stator 400. The accommodation lug 550 may be formed with a diameter same as or smaller than that of the inner surface of the through holes 411, 421 of the stator 400. The accommodation lug 550 may be integrally formed with the base 500, and may take a shape of a circular rim by being protrusively formed as shown in the drawing. Alternatively, at least two lugs may be protrusively formed each at equidistance or at a predetermined space apart to constitute the accommodation lug 550.

Furthermore, the first exemplary embodiment of the present disclosure may further include the following features in order to prevent foreign objects from being introduced into the stator 400 and to securely fix the stator 400.

The base 500 is formed at an upper surface with at least two adhesion grooves 560 to an external direction of the accommodation lugs 550, and the stator 400 may be formed with concave grooves 413, 423 at a position corresponding to that of the adhesive groove 560. That is, the concave grooves 413, 423 are formed correspondingly opposite to the second coil part 410 and the FPCB 420, and may be respectively formed in a shape of a small round hole arranged to an external side of the through holes 411, 421.

Referring to FIG. 3, when the stator 400 is mounted on the base 500, and an adhesive is injected into the concave grooves 413, 423, the adhesive injected into the concave grooves 413, 423 is introduced between an periphery of the accommodation lug 550 and an inner surface of the through holes 411, 421 of the stator 400 to inhibit any further inroad of foreign objects and to securely mount the stator 400. Furthermore, the adhesive is introduced downwards and into the adhesive groove 560 formed at the base 500 to enable a further secured mounting.

Furthermore, the base may be formed at an upper surface with a dust trap about the through hole 510, where the dust trap may be formed with an epoxy and the like. The dust trap may be formed at a circumference with a diameter greater than that of the through hole in a shape of a rectangle or various other shapes. Both the accommodation lug and the dust trap may be formed at the same time, or one of the accommodation lug and the dust trap may be formed.

Hereinafter, a second exemplary embodiment of the present disclosure will be described that is primarily different from the first exemplary embodiment.

Figure 5:
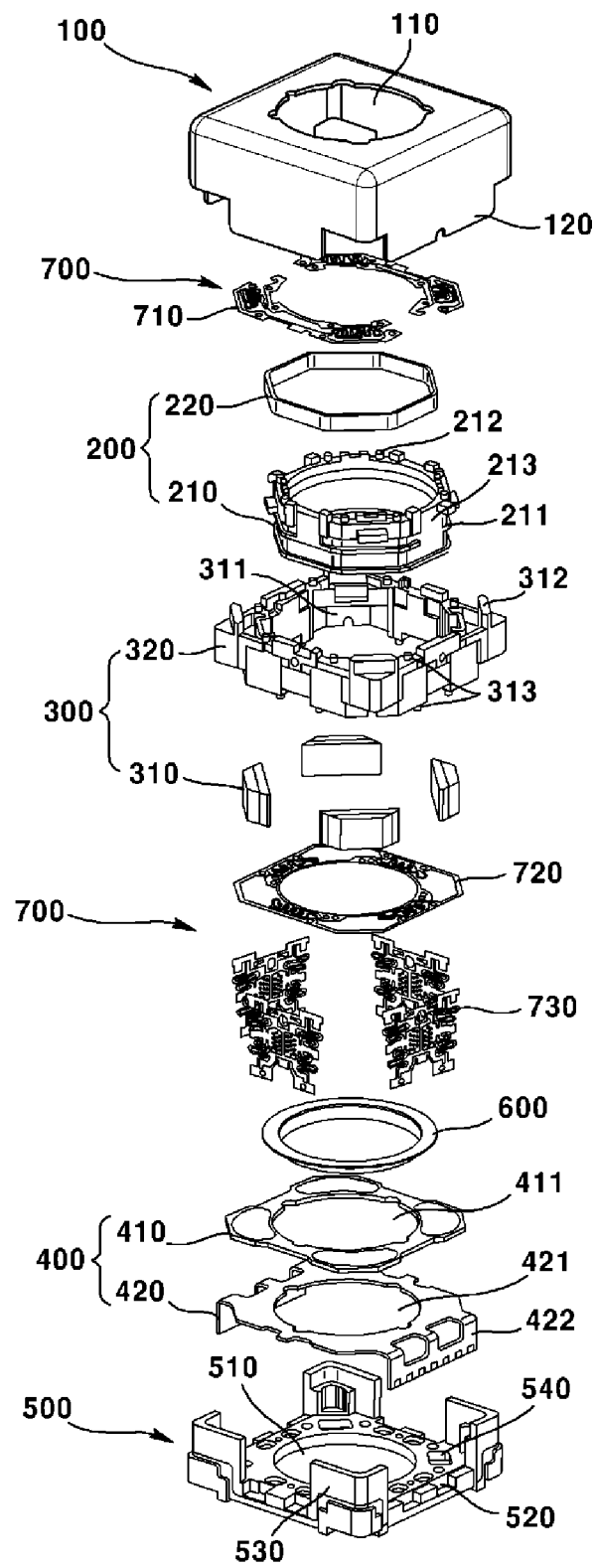
FIG. 5 is an exploded perspective view of a camera module according to a second exemplary embodiment of the present disclosure.
Figure 6:
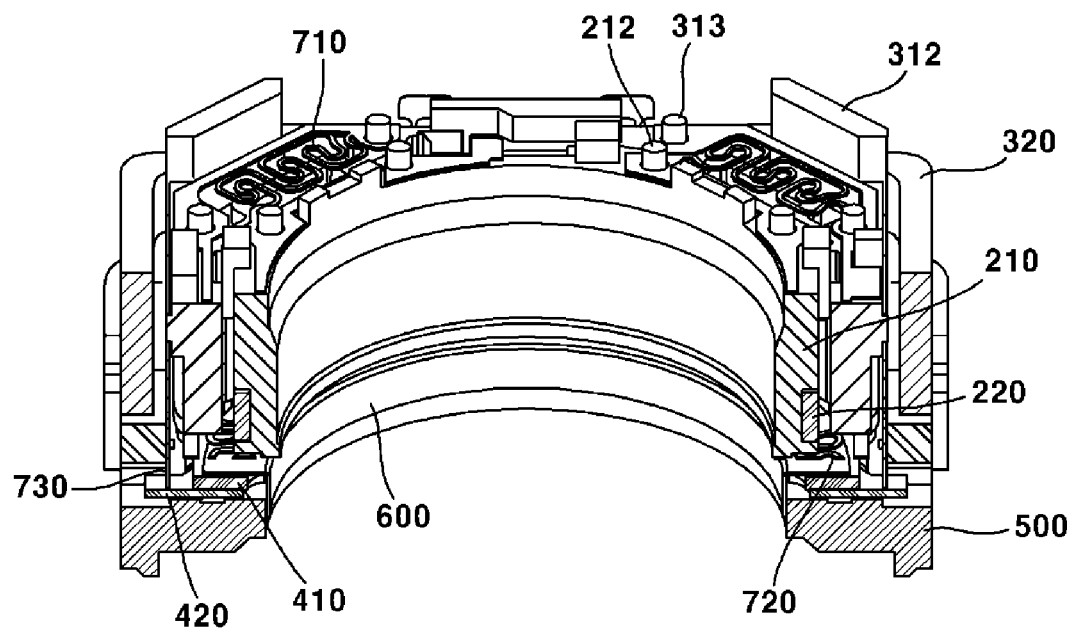
FIG. 6 is a lateral cross-sectional view of a cover can-free camera module according to a second exemplary embodiment of the present disclosure.
Figure 7:
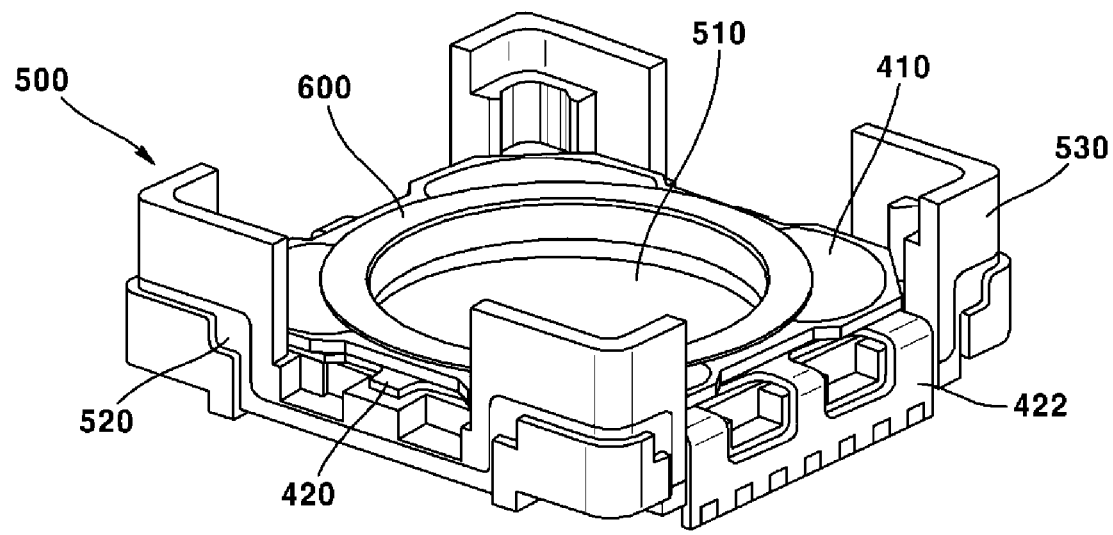
FIG. 7 is a schematic perspective view of a base, a stator and a foreign object prevention cap coupled according to a second exemplary embodiment of the present disclosure.
Figure 8:
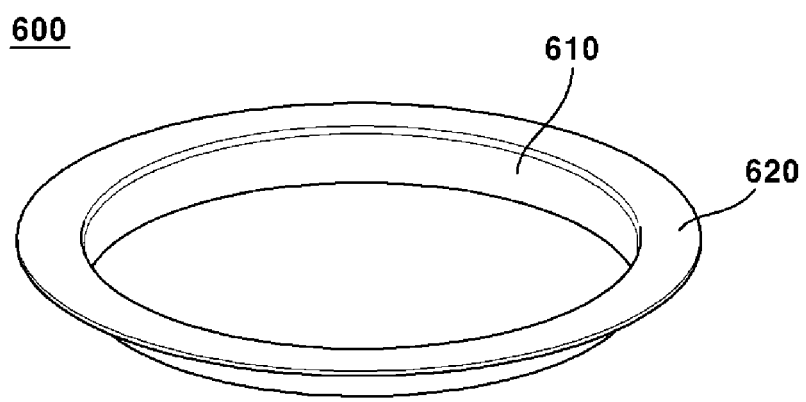
FIG. 8 is a schematic perspective view of a foreign object prevention cap according to a second exemplary embodiment of the present disclosure.

FIG. 5 is an exploded perspective view of a camera module according to a second exemplary embodiment of the present disclosure, FIG. 6 is a lateral cross-sectional view of a cover can-free camera module according to a second exemplary embodiment of the present disclosure, FIG. 7 is a schematic perspective view of a base, a stator and a foreign object prevention cap coupled according to a second exemplary embodiment of the present disclosure, and FIG. 8 is a schematic perspective view of a foreign object prevention cap according to a second exemplary embodiment of the present disclosure.

The second exemplary embodiment of the present disclosure includes a foreign object prevention cap 600. To be more specific, the foreign object prevention cap 600 inserted into the through holes 411, 421 of the stator 400 to wrap an upper surface and an inner surface of the through holes 411, 421 of the stator 400, and an inner surface of the hollow hole 510 of the base 500.

The foreign object prevention cap 600 may include a cylindrical part 610 formed in a same diameter as or smaller than that of the through hole 411, 421 of the stator 400 and the inner surface of the hollow hole 510 of the base 500, and a flange part 620 formed from an upper surface of the cylindrical part 610 to an external side to contact an upper surface of the stator 400. The cylindrical part 610 and the flange part 620 may be integrally formed, and may be formed by pressing or injection molding a thin plastic or a plate to minimize the thickness thereof.

Furthermore, the foreign object prevention cap 600 may be attached to an upper surface and an inner surface of the through holes 411, 421 of the stator 400, and an inner surface of the hollow hole 510 of the base 500 using an adhesive to promote fixation inside a camera module, and to prevent any further foreign objects from being generated from the FP coil or FPCB 420.

The first and second exemplary embodiments of the present disclosure may commonly further include an elastic unit 700 to provide a resetting force to the first mover 200 and the second mover 300, where the elastic unit 700 is preferably formed with a leaf spring formed by bending and cutting a single plate, as illustrated, to promote the manufacturing efficiency and the miniaturization of the lens actuating motor. The elastic unit 700 includes a bottom spring 720 fastened to a lower part of the bobbin 210 and the housing 320, an upper spring 710 fastened to an upper surface of the bobbin 210 and the housing 320, and a lateral spring 730 fastened to a lateral surface of the bobbin 210 and the base 500.

The lateral spring 730 formed of two lateral springs, the upper spring 710 and the first coil part 220 may be electrically connected to allow the lateral spring 730 formed of two springs to transmit an electric power to the upper spring 710 by receiving the electric power from a PCB (described later), and to allow the upper spring 710 to transmit the received electric power to the first coil part 220. At this time, the upper spring may be also formed of two upper springs, whereby each upper spring may function as a terminal.

In short, each of the upper spring, the bottom spring and the lateral spring (710, 720, 730) may be formed by a connection part configured to connect a first fastening part to a second fastening part, and to connect the first fastening part to a third fastening part. The connection part may be realized by at least two bending parts to connect the first and second fastening parts, where the first fastening part may be a part coupled to the housing, and the second fastening part may be a part connected to the bobbin, and vice versa.

The lens actuating motor according to the present disclosure may further include a PCB (Printed Circuit Board) where the PCB may be mounted under the base 500. Furthermore, the PCB may be mounted at an upper central surface with an image sensor (not shown), and also with various elements (not shown) to drive the lens actuating motor. The PCB may be electrically connected to the lateral spring 730 in order to apply an electric power for driving the first mover 200.

The image sensor (not shown) may be mounted at an upper central part of the PCB in order to be positioned along an optical direction with at least one lens (not shown) accommodated by the lens part. The image sensor may convert an optical signal of an object incident through the lens to an electric signal.

Meantime, the adhesive according to the present disclosure may be realized by a thermosetting epoxy or UV (Ultraviolet) epoxy, and may be hardened by exposure to heat or UV, where the adhesive using the thermosetting epoxy is a method of hardening by moving the adhesive in an oven or directly applying a heat to the adhesive, and the UV epoxy is a method of hardening by applying UV to the adhesive.

Furthermore, the adhesive may be an epoxy formed by mixing the thermosetting method with the UV hardening method, and may be an epoxy to be hardened by selecting any one of the thermosetting method with the UV hardening method. The adhesive is not limited to the abovementioned epoxy, and any material may be alternatively that is capable of attaching the elements.

The previous description of the present disclosure is provided to enable any person skilled in the art to make or use the inventive disclosure. Various modifications to the disclosure will be readily apparent to those skilled in the art, and the generic principles defined herein may be applied to other variations without departing from the spirit or scope of the disclosure. Thus, the present disclosure is not intended to limit the examples described herein, but is to be accorded the widest scope consistent with the principles and novel features disclosed herein.

An embodiment of the present disclosure is to provide a lens actuating motor configured to prevent an image sensor from being polluted by foreign objects and to improve reliability by securely fastening a stator to a base.

In order to achieve at least the above object, in whole or in part, and in accordance with the purpose of the disclosure, as embodied and broadly described, and in one general aspect of the present disclosure, there is provided a lens actuating motor, the lens actuating motor comprising: a first mover arranged at a lateral surface of a lens part to move the lens part; a second mover configured to accommodate the first mover for vertical movement; a stator positioned under the second mover to horizontally move the second mover and centrally formed with a through hole corresponding to the lens part; and a base configured to support the stator and the second mover, centrally formed with a hollow hole corresponding to the through hole of the stator, and including an accommodation lug which is inserted into the through hole of the stator by being protruded from the upper surface of the base where the hollow hole is formed.

Preferably, but not necessarily, the accommodation lug may be integrally formed with the base.

Preferably, but not necessarily, the accommodation lug may be formed by protruding in a shape of a circular rim.

Preferably, but not necessarily, the accommodation lug may be formed by at least two lugs being intermittently formed at an equidistant interval.

In another general aspect of the present disclosure, there is provided a camera module, the camera module comprising: a first mover arranged at a lateral surface of a lens part for moving the lens part; a second mover configured to accommodate the first mover for vertical movement; a stator positioned under the second mover for horizontally moving the second mover, and centrally formed with a through hole corresponding to the lens part; a base configured to support the stator and the second mover and centrally formed with a hollow hole corresponding the through hole of the stator; and a foreign object prevention cap inserted into the through hole of the stator to wrap an upper surface and an inner surface of the through hole of the stator, and an inner surface of the hollow hole of the base.

Preferably, but not necessarily, the foreign object prevention cap may include a cylindrical part formed in a same diameter as or smaller than that of the through hole of the stator and the inner surface of the hollow hole of the base, and a flange part formed from an upper surface of the cylindrical part to an external side to contact an upper surface of the stator.

Preferably, but not necessarily, the cylindrical part and the flange part may be integrally formed by injection molding.

Preferably, but not necessarily, the foreign object prevention cap may be attached to an upper surface and the inner surface of the through hole of the stator, and to an inner surface of the hollow hole of the base using an adhesive.

Preferably, but not necessarily, the first mover may include a bobbin configured to fix the lens part, and a first coil part arranged at a periphery of the bobbin, and the second mover may include a magnet part arranged opposite to the first coil part, and a housing fixed by the magnet part, and the stator may include a second coil part positioned opposite to a bottom surface of the magnet part, and an FPCB (Flexible Printed Circuit Board) fastened to an upper surface of the second coil part to apply an electric source.

Preferably, but not necessarily, an upper surface of the base may be formed with at least two adhesion grooves to an external direction of the accommodation lug, and the stator is formed at a position corresponding to the adhesion groove with a concave groove.

Preferably, but not necessarily, the concave groove may be formed with a diameter greater than that of the adhesion groove.

Preferably, but not necessarily, the second coil part may be an FP (Fine Pattern) coil.

Preferably, but not necessarily, the lens actuating motor may further comprise an elastic unit to provide a resetting force to the first mover and the second mover.

Preferably, but not necessarily, the elastic unit may include a bottom spring fastened to a lower part of the bobbin and the housing, an upper spring fastened to an upper surface of the bobbin and the housing, and a lateral spring fastened to a lateral surface of the bobbin.

Preferably, but not necessarily, the elastic unit may be a leaf spring.

Preferably, but not necessarily, the lens actuating motor may further comprise a Hall sensor part mounted at a lower part of the FPCB to correspond to a position of the magnet part.

Preferably, but not necessarily, the lens actuating motor may further comprise a cover can to form an exterior look of the lens actuating motor by being mounted at the base to accommodate the first mover, the stator and the second mover.

Preferably, but not necessarily, the cover can may be formed at each lower part of lateral surfaces with at least one extensively-formed fastening piece, and the base is formed with a fastening groove inserted by the fastening piece.

Preferably, but not necessarily, the lens actuating motor may further comprise a PCB (Printed Circuit Board) where the base is mounted at an upper surface and an image sensor is centrally mounted to convert an optical signal incident from the lens part to an electric signal.

ADVANTAGEOUS EFFECTS

An embodiment of the present disclosure has an advantageous effect in that an accommodation lug or a foreign object prevention cap is mounted to prevent foreign objects generated from inner constituent elements of the lens actuating motor from entering an image sensor to thereby provide a lens actuating motor enhanced in reliability, where the accommodation lug or the foreign object prevention cap are conducive to reinforcing a coupling between a stator and a base to improve durability to external shocks.

Another advantageous effect is that a cover can further reinforce a coupling with a base using a fastening piece, when the cover can is mounted.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lens actuating motor, the lens actuating motor comprising:
   a first mover comprising a bobbin configured to be coupled with a lens and a first coil arranged at the bobbin to move the lens;
   a second mover comprising a housing to accommodate the first mover and a magnet arranged at the housing;
   a stator comprising a second coil positioned to face a bottom surface of the magnet and centrally formed with a first hole and a substrate provided at a lower surface of the second coil and having a second hole corresponding to the first hole, wherein the substrate comprises a flexible printed circuit board (FPCB) having terminal parts disposed on lateral surfaces of the base, and the second coil is coupled to the FPCB and electrically connected to the FPCB to be applied with an electric source through the terminal parts;
   a Hall sensor part mounted at a lower surface of the FPCB and corresponding to a position of the magnet, wherein the Hall sensor part comprises two Hall sensors configured to detect the displacements of the magnet in directions of x axis and y axis;
   a base positioned under the second coil and centrally formed with a third hole corresponding to the first hole and the second hole of the stator, wherein the base comprises an accommodation lug protrusively formed from an upper surface of the base along the third hole thereof, wherein the base further comprises two Hall sensor accommodation grooves and the two Hall sensors are disposed in the two Hall sensor accommodation grooves, respectively; and
   a cover can mounted at the base to accommodate the first mover, the stator and the second mover, wherein the cover can comprises a metal material,
   wherein the accommodation lug has a diameter equal to or smaller than a diameter of the first and second holes of the stator and the accommodation lug is configured to be inserted through the first and second holes to couple the stator to the base,
   wherein the lateral surfaces of the base comprises a first lateral surface and a second lateral surface opposite to the first lateral surface,
   wherein the terminal parts of the FPCB comprises a first terminal part disposed on the first lateral surface and a second terminal part disposed on the second lateral surface, wherein the first terminal part and the second terminal part are electrically connected to a printed circuit board (PCB) which is connected to an image sensor, and wherein the base performs a sensor holder function to protect the image sensor and is configured to position an infrared (IR) filter.

2. The lens actuating motor of claim 1, wherein the accommodation lug is integrally formed with the base.

3. The lens actuating motor of claim 1, wherein the accommodation lug is formed by protruding in a circular shape.

4. The lens actuating motor of claim 1, wherein the accommodation lug is formed by at least two lugs being intermittently formed at an equidistant interval.

5. The lens actuating motor of claim 1, wherein an upper surface of the base is formed with at least two adhesion grooves outside the accommodation lug.

6. The lens actuating motor of claim 1, wherein the second coil is a fine pattern (FP) coil.

7. The lens actuating motor of claim 1, further comprising an elastic unit comprising:
a lower elastic unit fastened to a lower portion of the bobbin and the housing;
an upper elastic unit fastened to an upper portion of the bobbin and the housing; and
a lateral elastic unit supporting the housing and electrically connected to the FPCB.

8. The lens actuating motor of claim 7, wherein at least one of the lower elastic unit, the upper elastic unit, or the lateral elastic unit is a leaf spring.

9. The lens actuating motor of claim 1, wherein the cover can is formed with at least one extensively-formed fastening piece at a lower part of a lateral surface thereof, and the base is formed with a fastening groove in which the at least one extensively-formed fastening piece is disposed, and wherein the substrate comprises an opening corresponding to the fastening groove of the base.

10. The lens actuating motor of claim 1, wherein the accommodation lug is configured to wrap each an inner surface of the first hole and the second hole of the stator by being inserted into the first and second holes such that a foreign object is inhibited from entering the third hole of the base.

11. The lens actuating motor of claim 5, wherein the stator includes a concave groove or a fourth hole formed at a position corresponding to one of the adhesion grooves.

12. The lens actuating motor of claim 11, wherein the concave groove or the fourth hole is formed with a diameter greater than a diameter of the corresponding adhesion groove.

13. The lens actuating motor of claim 1, wherein the two Hall sensors comprises a first Hall sensor and a second Hall sensor, and wherein the first and second Hall sensors are positioned such that an angle between an imaginary line connecting the first Hall sensor and an optical axis and an imaginary line connecting the second Hall sensor and the optical axis is perpendicular.

14. A camera module having a foreign object prevention structure, the camera module comprising:
a first mover comprising a bobbin coupled with a lens part and a first coil arranged at the bobbin for moving the lens part;
a second mover comprising a housing and a magnet arranged at the housing to accommodate the first mover;
a stator positioned under the second mover for horizontally moving the second mover, and centrally formed with a through hole corresponding to the lens part;
a base configured to support the stator and the second mover and centrally formed with a hollow hole corresponding to the through hole of the stator; and
a foreign object prevention cap configured to be inserted into the through hole of the stator,
wherein the foreign object prevention cap comprises a cylindrical part to wrap an inner surface of the through hole of the stator and a flange part extended from an upper surface of the cylindrical part to contact an upper surface of the stator along the through hole thereof, and
wherein the flange part is attached to the upper surface of the stator and the cylindrical part is attached to the inner surface of the through hole of the stator and an inner surface of the hollow hole of the base to couple the stator to the base.

15. The camera module of claim 14, wherein the cylindrical part of the foreign object prevention cap has a diameter equal to or smaller than a diameter of the through hole of the stator and a diameter of the hollow hole of the base.

16. The camera module of claim 15, wherein the cylindrical part and the flange part are integrally formed by injection molding.

17. The camera module of claim 14, wherein the foreign object prevention cap is attached to the upper surface and the inner surface of the through hole of the stator, and to the inner surface of the hollow hole of the base using an adhesive.

18. A camera module, the camera module comprising:
a first mover comprising a bobbin configured to be coupled with a lens and a first coil arranged at the bobbin to move the lens;
a second mover comprising a housing to accommodate the first mover and a magnet arranged at the housing;
a stator comprising a second coil positioned to face a bottom surface of the magnet and centrally formed with a first hole and a substrate provided at a lower surface of the second coil and having a second hole corresponding to the first hole, wherein the substrate comprises a flexible printed circuit board (FPCB) having terminal parts disposed on lateral surfaces of the base, and the second coil is coupled to the FPCB and electrically connected to the FPCB to be applied with an electric source through the terminal parts;
a Hall sensor part mounted at a lower surface of the FPCB and corresponding to a position of the magnet, wherein the Hall sensor part comprises two Hall sensors configured to detect the displacements of the magnet in directions of x axis and y axis;
a base positioned under the second coil and centrally formed with a third hole corresponding to the first hole and the second hole of the stator, wherein the base comprises an accommodation lug protrusively formed from an upper surface of the base along the third hole thereof, wherein the base further comprises two Hall sensor accommodation grooves and the two Hall sensors are disposed in the two Hall sensor accommodation grooves, respectively;
a cover can mounted at the base to accommodate the first mover, the stator and the second mover, wherein the cover can comprises a metal material;
an image sensor disposed below the base, and
a Printed Circuit Board (PCB) disposed below the image sensor and coupled to the base, wherein the base performs a sensor holder function to protect the image sensor and is configured to position an IR filter, wherein the accommodation lug has a diameter equal to or smaller than a diameter of the first and second holes of the stator and the accommodation lug is configured to be inserted through the first and second holes to couple the stator to the base, wherein the lateral surfaces of the base comprises a first lateral surface and a second lateral surface opposite to the first lateral surface, wherein the terminal parts of the FPCB comprises a first terminal part disposed on the first lateral surface and a second terminal part disposed on the second lateral surface, and wherein the PCB is the first terminal part and the second terminal part.

19. A mobile phone comprising the camera module of claim 18.

20. The camera module of claim 18, wherein the accommodation lug is configured to wrap each an inner surface of the first hole and the second hole of the stator by being inserted into the first and second holes such that a foreign object is inhibited from entering the third hole of the base.

\* \* \* \* \*